(12) United States Patent
de Boer et al.

(10) Patent No.: US 10,697,896 B2
(45) Date of Patent: Jun. 30, 2020

(54) METHOD AND SYSTEM FOR MEASURING A SENSOR

(71) Applicant: Nederlandse Organisatie voor toegepast-natuurwetenschappelijk onderzoek TNO, 's-Gravenhage (NL)

(72) Inventors: Bart Michiel de Boer, Rotterdam (NL); Paul Louis Maria Joseph van Neer, Bergschenhoek (NL); Peter Johan Harmsma, Vleuten (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 276 days.

(21) Appl. No.: 15/764,954

(22) PCT Filed: Oct. 7, 2016

(86) PCT No.: PCT/NL2016/050695
§ 371 (c)(1),
(2) Date: Mar. 30, 2018

(87) PCT Pub. No.: WO2017/061868
PCT Pub. Date: Apr. 13, 2017

(65) Prior Publication Data
US 2018/0266964 A1    Sep. 20, 2018

(30) Foreign Application Priority Data
Oct. 8, 2015 (EP) .................. 15188926.8

(51) Int. Cl.
*G01N 21/77* (2006.01)
*G02B 6/12* (2006.01)

(52) U.S. Cl.
CPC . *G01N 21/7746* (2013.01); *G01N 2021/7793* (2013.01); *G01N 2201/0873* (2013.01);
(Continued)

(58) Field of Classification Search
CPC ....... G01N 21/7746; G01N 2201/0873; G01N 2021/7793; G01N 29/46; G01N 30/8617;
(Continued)

(56) References Cited

U.S. PATENT DOCUMENTS 5,875,258 A * 2/1999 Ortyn ............... G01N 35/00594
128/922
6,002,472 A * 12/1999 Naka ................... C03B 37/0253
250/559.24
(Continued)

OTHER PUBLICATIONS

Yoon Min-Seok et al., "Relative Humidity Sensor Based on an Optical Microfiber Knot Resonator with a Polyvinyl Alcohol Overlay," Proc. of SPIE, vol. 9634, pp. 96346X-1 to 96346X-4, Sep. 28, 2015 (4 pages) XP060057391.
(Continued)

*Primary Examiner* — Dominic J Bologna
(74) *Attorney, Agent, or Firm* — Leydig, Voit & Mayer, Ltd.

(57) ABSTRACT

The present disclosure concerns a method and apparatus for measuring a sensor (10) comprising multiple optical resonators (11, 12) optically connected to a single optical output interface (16). The optical resonators (11, 12) are interrogated with a light input signal (Si). A light output signal (So) is measured from the optic al output interface (16) to determine a combined spectral response (Sa) covering a wavelength range (W) including a plurality of resonance peaks ($\lambda 1,i$, $\lambda 2,j$) for each of the optical resonators (11, 12). A Fourier transform spectrum (FT) of the combined spectral response (Sa) is calculated and a harmonic series of periodic peaks (n·f1) is identified in the Fourier transform spectrum (FT). The harmonic series of periodic peaks is filtered to obtain a filtered Fourier transform spectrum (FT1) and a sensor signal is calculated (X1) based on the filtered Fourier transform spectrum (FT1).

15 Claims, 7 Drawing Sheets

(52) U.S. Cl.
CPC .............. *G02B 6/12004* (2013.01); *G02B 2006/12109* (2013.01); *G02B 2006/12138* (2013.01)

(58) Field of Classification Search
CPC ............ G01N 2223/345; G01N 17/14; G01N 17/142; G02B 2006/12109; G02B 6/12004; G02B 2006/12138
See application file for complete search history.

(56) References Cited

U.S. PATENT DOCUMENTS

| | | | | |
|---|---|---|---|---|
| 6,002,952 | A * | 12/1999 | Diab | A61B 5/02416 600/310 |
| 6,813,927 | B1 * | 11/2004 | Harris | G01N 33/46 73/12.12 |
| 7,796,262 | B1 | 9/2010 | Wang et al. | |
| 2010/0139403 | A1 * | 6/2010 | Liang | G01N 29/14 73/587 |
| 2011/0062339 | A1 * | 3/2011 | Ruhge | G01N 25/72 250/340 |
| 2013/0144561 | A1 * | 6/2013 | Harb | G01J 3/4338 702/189 |
| 2014/0107979 | A1 * | 4/2014 | Llinas | G06K 9/00543 702/189 |

OTHER PUBLICATIONS

Barrios, "Integrated Microring Resonator Sensor Arrays for Labs-on-Chips," Analytical and Bioanalytic Chemistry, vol. 403, pp. 1467-1475, Mar. 30, 2012 (9 pages) XP035057332.

Xu et al., "Label-Free Biosensor Array Based on Silicon-on-Insulator Ring Resonators Addressed Using a WDM Approach," Optic Letters, Optical Society of America, US, vol. 35, No. 16, Aug. 15, 2010 (3 pages) XP001556781.

European Patent Office, International Search Report in corresponding International Application No. PCT/NL2016/050695 dated Dec. 2, 2016 (3 pages).

* cited by examiner

METHOD AND SYSTEM FOR MEASURING A SENSOR

CROSS-REFERENCE TO RELATED APPLICATIONS

This patent application is a U.S. National Phase of PCT International Application No. PCT/NL2016/050695, filed Oct. 7, 2016, which claims priority to European Application No. 15188926.8, filed Oct. 8, 2015, which are both expressly incorporated by reference in their entireties, including any references contained therein.

TECHNICAL FIELD AND BACKGROUND

The present disclosure relates to optical sensors, in particular to a method and apparatus for measuring a sensor comprising a plurality of optical resonators that are optically connected to a single optical output interface. The disclosure also relates to calculating a sensor signal based on response spectra for one or more optical resonators.

A photonic integrated circuit (IC) also known as an integrated optical circuit is a device that integrates photonic functions. Light traversing the circuit can be guided and/or processed by the circuit. One example of a photonic integrated circuit comprises a ring resonator arranged in proximity to a waveguide. Light in the waveguide may couple to the ring, e.g. by an evanescent field. The ring may have one or more resonant wavelengths that are selectively or predominantly absorbed or transmitted through the optical circuit as a result of interaction with the ring resonator. A resonant wavelength of the ring can depend on a physical (internal or external) parameter influencing the ring. Accordingly, the ring can exhibit a spectral signature that can be used to quantify said physical parameter, e.g. temperature, pressure, chemical data, et cetera.

The circuit can be interrogated (read out) by an apparatus, e.g. analyser. For example, the analyser can couple light into an input interface and read out light from an output interface to measure the spectral signature of the optical sensing element and quantify the physical parameter. The analyser can be a separate instrument for interrogating a photonic circuit integrated on a sensor chip. In this way different circuits can be interrogated by a single instrument. To provide a flexible connection between the analyser and circuit, light can be free-space coupled into the circuit via an optical port or interface, e.g. a vertical grating coupler. For example, the analyser comprises an objective lens, or an optical fibre that is brought in close proximity to the optical port.

An optical circuit may comprise a plurality of optical resonators, which may be configured to measure the same or different physical parameters. For example a biosensor array can be provided to measure a reaction process. The optical circuit may be designed such that each optical resonator has a separate output interface to distinguish signals from each of the resonators, e.g. as described by M. Iqbal et al. ("Label-Free Biosensor Arrays Based on Silicon Ring Resonators and High-Speed Optical Scanning Instrumentation", IEEE Journal Of Selected Topics In Quantum Electronics, Vol. 16, No. 3, May/June 2010). The prior art discloses using a separate output coupler for each resonator.

To simplify coupling between the analyser and the optical circuit it is desired to provide a minimum of optical interfaces. However, when multiple optical resonators are connected to a single output interface, the spectral responses may overlap making it difficult to distinguish the signals of each resonator. This is especially difficult if the individual characteristics of the optical resonators are not a priori known e.g. due to variable manufacturing conditions and/or the initial response to the physical parameters to be measured. It is thus desired to provide a method and apparatus that simplifies measuring a combined spectrum of multiple optical resonators and isolating the sensor signal of an individual optical resonator having a priori unknown response characteristics.

SUMMARY

A first aspect of the present disclosure provides a method for measuring a sensor (e.g. an optical chip) comprising multiple optical resonators optically connected to a single optical output interface. Each optical resonator has a spectral response comprising a series of resonant features manifesting as peaks of dips at distinct wavelengths. The wavelengths of the resonances are indicative of the sensor measurable or parameter. For example, the resonances typically manifest as transmission and/or absorption peaks or minima at a relatively narrow wavelength interval around each distinct (resonant) wavelengths of the optical resonator. The method comprises interrogating the optical resonators with a light input signal and measuring a light output signal from the optical output interface. A combined spectral response is determined from the light output signal, e.g. by comparing with the light input signal. The combined spectral response covers a wavelength range including a plurality of the resonance peaks for each of the optical resonators. The method comprises calculating a Fourier transform spectrum of the combined spectral response, determining a harmonic series of periodic peaks in the Fourier transform spectrum, and filtering the series of periodic peaks to obtain a filtered Fourier transform spectrum. A sensor signal corresponding to one of the optical resonators can be calculated based on the filtered Fourier transform spectrum.

It will be appreciated that by Fourier transforming the combined spectral response, the signal of the individual resonators may be recognized and isolated. The signal of each resonator comprises a series of distinct peaks at an interval determined by a unique dimension (optical path length) provided by the resonator and the input measurable parameter which can have an influence on the dimension or the refractive index. The peaks in the absorption spectrum may occur at a semi-periodic interval. This may exhibit as corresponding peak in the Fourier transform in the form of a main amplitude peak repeated at frequency intervals corresponding to higher harmonics. The amplitude of subsequent peaks decreases. Accordingly, the main peak of a resonator may be recognized e.g. as having a relatively high amplitude. Starting from that peak the position of the harmonics can be modeled e.g. as being at an integer number of times the frequency of the main amplitude. Once the positions of the peaks corresponding to one optical resonator are identified, these can be appropriately filtered to isolate the signal of that resonator, e.g. either keeping only the filtered signal or removing the filtered signal. When the signal of one resonator is isolated, the sensor signal can be determined, e.g. directly from the filtered Fourier spectrum, or after inverse Fourier transformation to recover an isolated signal from the resonator in the wavelength domain.

Typically, an interval between the resonance peaks determined by their respective wavelengths is dependent on a dimension of the optical resonators. For example, the distinct wavelengths of the resonance peaks are determined by distinct optical path lengths of light traversing the respective optical resonator. A resonance may occur for example when an integer number of wavelengths fits the path length of the resonator, e.g. circumference of an optical ring structure. By providing a resonator with an optical path length that is relatively large compared to a wavelength of the light input signal, a series of resonance peaks may be achieved relatively close together. Accordingly, multiple peaks can be scanned without requiring a broad interrogation wavelength band. At higher integer number, the resonance peaks may also be relatively periodic. To provide a further improved regular interval between the resonance peaks, the response signal can be expressed in reciprocal wavelength units.

Preferably, the optical resonators each have a different free spectral rang, i.e. distinct distance between adjacent resonance wavelengths. More preferably, the series of one wavelength has minimal overlap with a series of other wavelengths. To better distinguish the peaks in the Fourier spectrum, it is desirable that a fundamental peak of one resonator does not overlap a harmonic peak of another resonator. Accordingly, for example a harmonic series of peak may be determined by selecting a fundamental peak at a main frequency in the Fourier transform spectrum and including corresponding harmonic peaks of the main frequency, e.g. at integer multiples of the fundamental peak. For example, the fundamental peak is selected as a peak in the Fourier transform spectrum having a largest amplitude. For example the harmonic series of peaks can be identified by modeling, calculating, and/or fitting a periodic pattern of peaks. The modeling may include further characteristics of the resonator response. For example, an amplitude of higher harmonics may decrease.

Filtering the harmonic series of one resonator may comprise either keeping only that series, or removing the series, depending on the filter used. For example, a comb filter can be used which filters the Fourier spectrum at a narrow band around the identified harmonic peaks. The procedure of identifying a harmonics series and filtering the series may be repeated to isolate the Fourier spectra of each resonator. The inverse Fourier transform filtered or isolated Fourier spectrum may be used to determine the sensor value. Alternatively, or in addition, one or more filtered Fourier spectra may be transformed back to the wavelength (or inverse wavelength) domain. In addition, in case harmonics of the different ring resonator responses have a small separation, or even partly overlap, the harmonics can be omitted to avoid crosstalk, i.e. a shift in the response of one ring resonator interpreted as being a shift of another ring resonator.

In the wavelength domain, the amount of shift of the resonance peaks, e.g. compared to a base position, can be a measure for the sensor value. Accordingly, the sensor signal for each of the resonators can be calculated. It is found particularly advantageous to calculate a cross-correlation between spectral responses of one of the optical resonators. For example, a maximum value in the cross-correlation between a first series of peaks and a second series of peak may indicate the amount of wavelength shift. To increase precision or resolution, the maximum can be calculated by interpolating the cross-correlation. It will be appreciated that by calculating a cross-correlation of a plurality of peaks per resonator does not require a priori knowledge of the position of any one resonance. Each of the peaks may contribute to the cross-correlation which can be sampled across any wavelength window comprising sufficient peaks.

For example, one input to the cross-correlation can be a base or default spectrum and the other the actual spectrum. Alternatively, spectra a different times are cross correlated, e.g. to record the wavelength shift as a function of time. For example, a reaction between substances can be monitored by the sensor based on deposition of a an analyte onto the sensor.

A second aspect of the present disclosure provides an apparatus for measuring the sensor comprising multiple optical resonators optically connected to a single optical output interface. The apparatus comprises a light source configured to interrogate the optical resonators with a light input signal and a light sensor configured to measure a light output signal from the optical output interface to determine a combined spectral response covering a wavelength range including a plurality of the resonance peaks for each of the optical resonators. A controller is configured and programmed to calculate a Fourier transform spectrum of the combined spectral response, determine a series of periodic peaks in the Fourier transform spectrum, filter the series of periodic peaks to obtain a filtered Fourier transform spectrum, and calculate a sensor signal corresponding to one of the optical resonators based on the filtered Fourier transform spectrum or on the inverse Fourier transformed filtered Fourier transform of the spectrum.

A third aspect of the present disclosure provides a sensor array comprising multiple optical resonators optically connected to a single optical output interface; wherein each optical resonator has a spectral response comprising a series of resonance peaks at distinct wavelengths, wherein the wavelengths of the resonance peaks are indicative of a sensor measurable. For example, the sensor array is a biosensor array.

It will be appreciated that some of the methods described herein have wider application to determining sensor signals from one or more optical resonators. Accordingly, a fourth aspect of the present disclosure provides a method for calculating a sensor signal of an optical resonator comprising interrogating the optical resonator with an input signal covering a series of resonance peaks of the optical resonator, wherein the wavelengths of the resonance peaks are indicative of the sensor signal; recording a first and second spectral response, of the optical resonator, wherein the first and second spectral response comprise resonance peaks that are shifted in wavelength between the responses; calculating a cross-correlation between the first spectral response and the second spectral response; determining a maximum in the cross-correlation; and calculating the sensor signal based on position of the maximum.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Unless otherwise defined, all terms (including technical and scientific terms) used herein have the same meaning as commonly understood by one of ordinary skill in the art to which this invention belongs as read in the context of the description and drawings. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some instances, detailed descriptions of well-known devices and methods may be omitted so as not to obscure the description of the present systems and methods. Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise. All publications, patent applications, patents, and other references mentioned herein are incorporated by reference in their entirety. In case of conflict, the present specification, including definitions, will control.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. The description of the exemplary embodiments is intended to be read in connection with the accompanying drawings, which are to be considered part of the entire written description. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1:
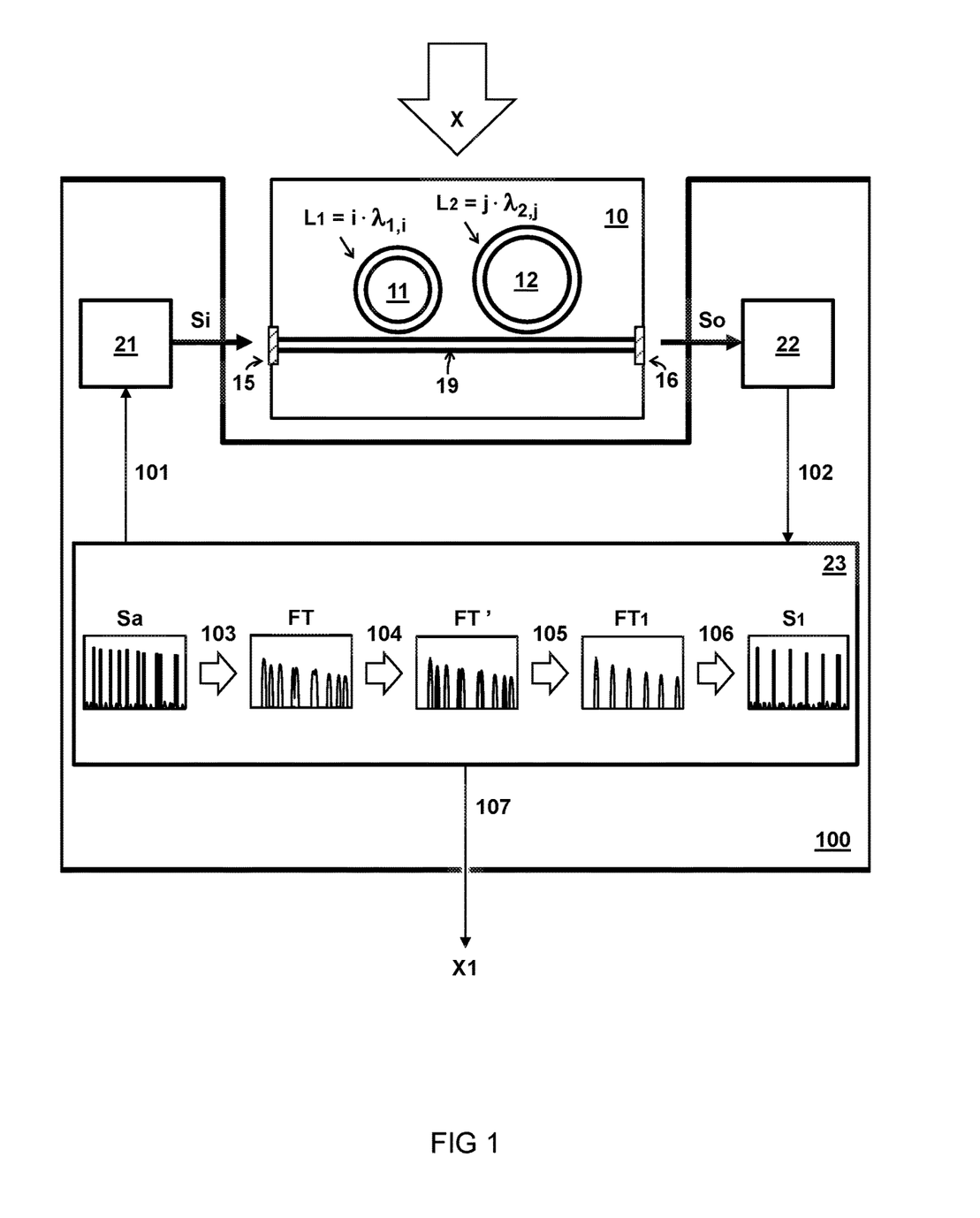
FIG. 1 shows a schematic embodiment of measuring a sensor comprising multiple optical resonators optically connected to a single optical output interface.

FIG. 1 shows a schematic embodiment of measuring a sensor 10 comprising multiple optical resonators 11, 12 optically connected to a single optical output interface 16.

In one embodiment, each optical resonator 11, 12 has a respective spectral response S1,S2 comprising a series of resonance peaks at distinct wavelengths $\lambda_{1,i}$ and $\lambda_{2,j}$. The wavelengths of the resonance peaks are indicative of a sensor measurable $X_1$, $X_2$. For example a sensor 10 comprises coating is provided on top of ring resonator 11. A refractive index, optical loss, reflection coefficient and/or length of the ring may change as a function of concentration of a target substance. The resonators 11, 12 may lie in the vicinity of an optical pathway 19, e.g. waveguide. The coupling of the light in the pathway 19 and the resonators 11, 12 may cause spectral changes in the transmitted and/or reflected light. Instead of a single waveguide 19, as shown also further waveguides can be used (not shown), e.g. a first waveguide couples light into a ring resonator, which then couples to a second waveguide. Alternative or in addition to absorption peaks, resonances in the output signal may manifest as transmission peaks.

In accordance with some aspects of the present disclosure, the figure illustrates a method comprising interrogating (101) the optical resonators 11, 12 with a light input signal Si and measuring (102) a light output signal So from the optical output interface 16 to determine a combined spectral response Sa covering a wavelength range W including a plurality of the resonance peaks $\lambda_{1,i}$; $\lambda_{2,j}$ for each of the optical resonators 11, 12. The method further comprises calculating (103) a Fourier transform spectrum FT of the combined spectral response Sa. The method further comprises identifying (104) a harmonic series of periodic peaks n·f1 in the Fourier transform spectrum FT. The method further comprises filtering (105) the harmonic series of periodic peaks to obtain a filtered Fourier transform spectrum FT1. The method further comprises calculating (107) a sensor signal X1 corresponding to one of the optical resonators 11 based on the filtered Fourier transform spectrum FT1 and/or the inverse Fourier transform thereof. In one embodiment, the method comprises back-transforming (106) the filtered Fourier spectrum FT1 to obtain an isolated spectral response S1. Also other mathematical transformations or filtering can take place to extract the sensor signal X1 from the filtered Fourier spectrum FT1. It will be appreciated that multiple different parameters be simultaneously or sequentially measured using multiple optical resonators. For example sensor signals X1 and X2 corresponding to respective optical resonators 11 and 12, can both be calculated from respective filtered Fourier transform spectrum FT1 and FT2.

In one embodiment, the sensor 10 comprises an optical chip. For example, the sensor 10 comprises an optical circuit 19 coupling light from an optical input interface 15 to the optical resonators 11, 12 and/or from the optical resonators 11, 12 to the optical output interface 16. Typically, the sensor 10 comprises one or more optical couplers 15, 16 for coupling light into and/or out of the sensor 10. For example, an optical coupler comprises an optical grating coupler or vertical grating coupler.

In one embodiment, the resonance peaks are transmission and/or absorption peaks caused by the optical resonator 11 at a relatively narrow wavelength interval around the distinct wavelengths $\lambda_{1,i}$. In another or further embodiment, an interval between the peaks is dependent on a dimension L1 of the optical resonators 11. For example the distinct wavelengths λ1 of the resonance peaks of a respective optical resonator 11 are determined by its dimension L1. Accordingly, the combined spectral response Sa comprises absorption peaks at wavelengths $\lambda_1, i, \lambda_2, j$ corresponding to integer fractions i,j of the optical path lengths L1,L2 of the optical resonators 11, 12. For example, the distinct wavelengths λ1 of the resonance peaks are determined by distinct optical path lengths L1,L2 of light traversing the respective optical resonator 11, 12. Preferably, optical resonators 11, 12 are used having different free spectral range FSR. In one embodiment, the optical resonators comprise an optical ring resonator.

In one embodiment, the optical path lengths L1,L2 of the resonators L1,L2 are at least a hundred times a wavelength λ of the light input signal Si. Accordingly, resonances may be relatively close together and the combined spectral response Sa preferably comprise at least five, ten, twenty, or even more resonance peaks per resonator.

In accordance with some aspects of the present disclosure, the figure illustrates an apparatus 100 for measuring a sensor 10 as described herein.

In one embodiment, the apparatus comprises a light source 21 configured to interrogate 101 the optical resonators 11, 12 with a light input signal Si. For example a broad band light source can be used, or a narrow band can be scanned over a range of wavelengths. Also combinations are possible. For example a laser can be used. In one embodiment, an optical fibre is used for coupling light into an input interface 15 of the sensor, e.g. a vertical grating coupler. Another or the same optical fibre can also be used for coupling light out of the sensor 10.

In one embodiment, a light sensor 22 is configured to measure 102 a light output signal So from the optical output interface 16. The optical output interface 16 may be a separate interface, as shown, or the same interface as the input interface 15. From the light output signal So, a combined spectral response Sa may be obtained. The combined spectral response Sa preferably covers a wavelength range W including a plurality of the resonance peaks λ1,i; λ2,j for each of the optical resonators 11, 12.

In one embodiment, a controller 23 configured and programmed to calculate 103 a Fourier transform spectrum FT of the combined spectral response Sa. In another or further embodiment, the controller is configured and programmed to identify 104 a harmonic series of periodic peaks n·f1 in the Fourier transform spectrum FT. In another or further embodiment, the controller is configured and programmed to filter 105 the harmonic series of periodic peaks to obtain a filtered Fourier transform spectrum FT1. In another or further embodiment, the controller is configured and programmed to calculate 107 a sensor signal X1 corresponding to one of the optical resonators 11 based on the filtered Fourier transform spectrum FT1. Also further steps may be performed by the controller, e.g. calculating 106 an inverse Fourier transform to recover the isolated spectral response S1 of a resonator 11. Some steps may also be repeated, e.g. identifying and filtering harmonic series of response peaks for each resonator.

For example, the sensor 10 comprises a biosensor array comprising multiple optical resonators 11, 12 optically connected to a single optical output interface 16; wherein each optical resonator 11 has a spectral response S1 comprising a series of resonance peaks at distinct wavelengths λ1,i, wherein the wavelengths λ1,i of the resonance peaks are indicative of a sensor measurable X.

Figure 2:
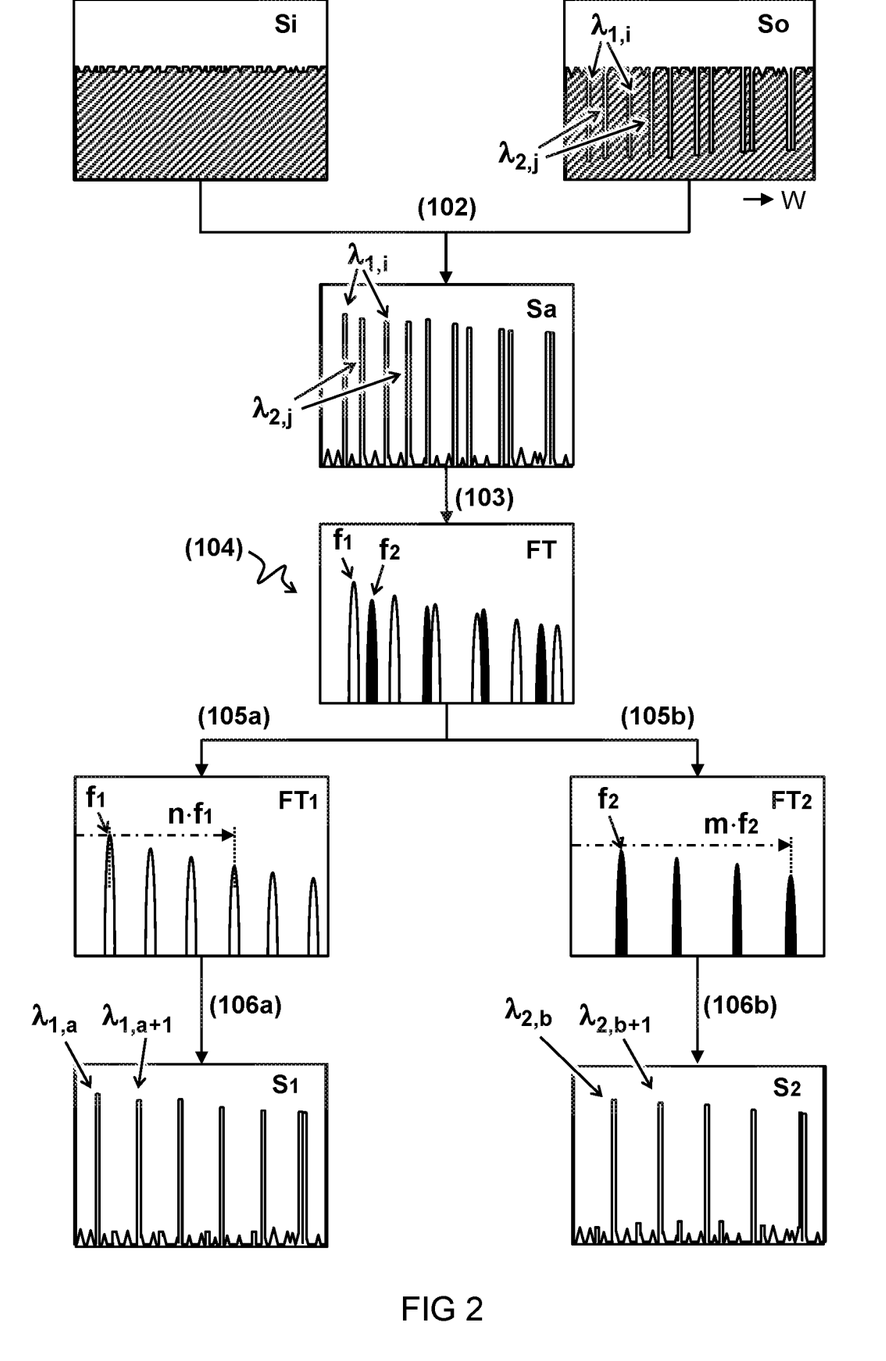
FIG. 2 shows another or further schematic embodiment detailing different steps in the embodiment of calculating the signal from the measurement spectra.

FIG. 2 shows another or further schematic embodiment detailing different steps 100-106 in the embodiment of calculating a signal from the measurement spectrum.

In one embodiment, the combined spectral response Sa is calculated 102 by comparing a light output signal So, measured at the optical output interface, with a light input signal Si, provided at an optical input interface of the sensor. For example, a transmission spectrum may be converted to an absorption spectrum showing peaks at resonant wavelengths.

In one embodiment, multiple series of periodic peaks n·f1; m·f2 are identified in the Fourier transform spectrum FT, wherein the step of filtering 105a, 105b the Fourier transform spectrum FT is repeated to isolate spectral responses S1,S2 for a corresponding multiple of the optical resonators 11, 12.

One embodiment comprises identifying a first series of harmonic peaks n·f1 in the Fourier transform spectrum FT and identifying a second series of harmonic peaks m·f2 in the Fourier transform spectrum FT. In another or further embodiment, the filtering the harmonic series of periodic peaks comprises rejecting a subset of the identified peaks. For example the rejected subset comprises peaks from the first series and/or peaks from the second series that are within a threshold frequency difference $f_d$ from each other, i.e. $|n·f1−m·f2|<f_d$ Also other or further processing steps can be used. For example, in some embodiments, a high-pass filter can be used, e.g. to deal with reflections in signal (lower frequency than the fundamental ring response) due to gluing of fibers, etc. In some embodiments, windowing of data can be used, e.g. a Tukey window to force start/end of window to be zero. In some embodiments, a low-pass filter is employed, to allow for/deal with selection of optimal number of harmonics (trade-off number of harmonics and noise level) for precision and removal of spurious cavity resonances with small wavelength The Fourier Transform (FT) of a ring response typically consists of a main peak corresponding to its Free Spectral Range (FSR), and higher harmonics. The FSR is the separation between the resonances:

$$FSR = \frac{\lambda^2}{n_g L}$$

$$n_g = n - \lambda \frac{dn_{\mathit{eff}}}{d\lambda}$$

With "$n_g$" the group index, $n_{\mathit{eff}}$ the effective refractive index of the ring, and L the physical ring length. The main peak for ring i is at a frequency $f_{0,i}=1/FSRi$. The FT of a serial response may reveal all main peaks+harmonics of each ring. For the current purposes it is preferable that each ring has a unique FSR (unique length). Consequently, the fundamental peaks in the FT do not overlap. Higher harmonics may occasionally overlap if $n·f_1 = m·f_2$. In one embodiment harmonics n·f1 and m·f2 are omitted if n·f1−n·f2 is smaller than a predefined threshold.

Figure 3A:
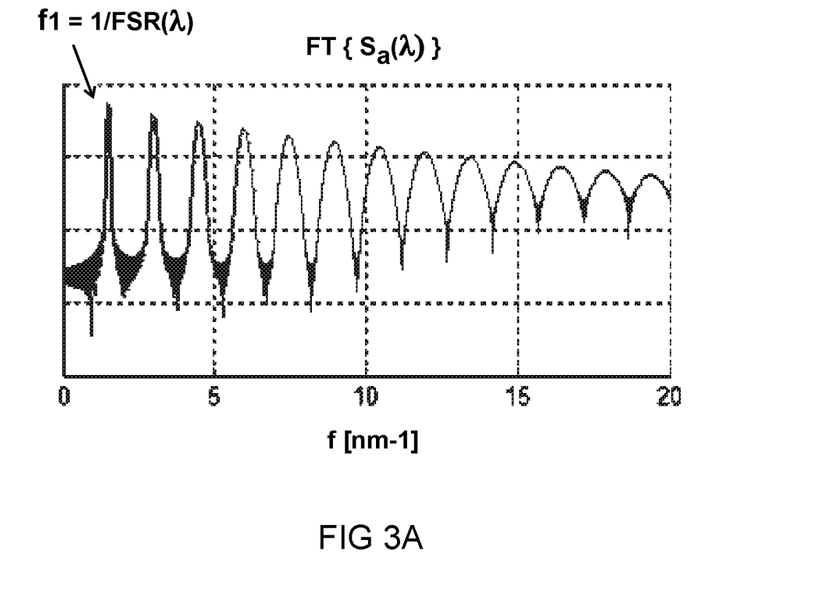
FIGS. 3A and 3B show graphs illustrating advantages of using reciprocal wavelengths in the Fourier transform spectra.
Figure 3B:
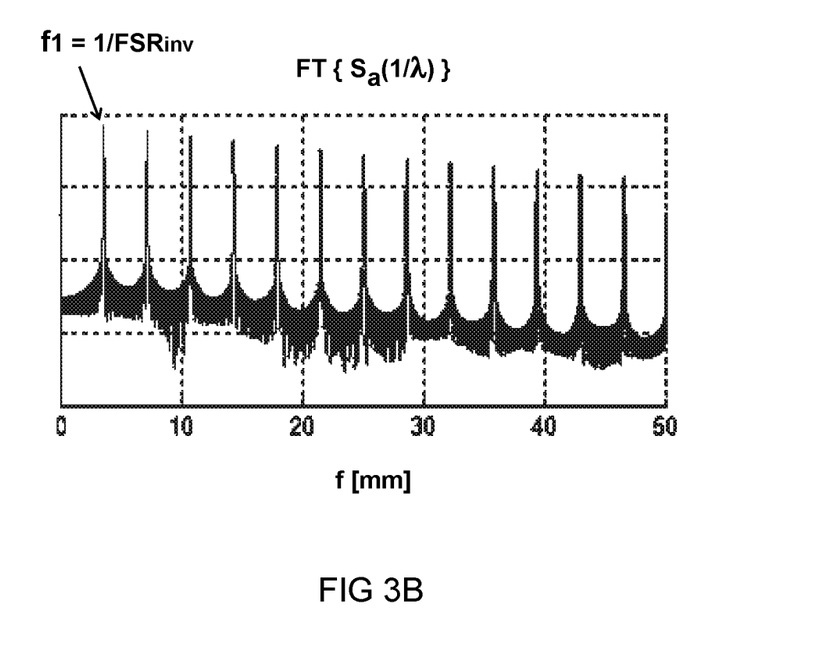

FIGS. 3A and 3B show graphs illustrating advantages of using reciprocal wavelengths in the Fourier transform spectra.

It is noted from the above formulae that the FSR is wavelength dependent. A Fourier transform over large wavelength span may thus show broadening harmonics due to the variation in FSR (FIG. 3A). However using data expressed in term of reciprocal wavelength (1/λ) can results in narrow harmonics (FIG. 3B), since now the FSR is fixed:

$$FSR_{inv} = \frac{1}{n_g L}$$

The effect may be relatively small when using only small wavelength spans, but may still be beneficial. Accordingly, in one embodiment, the Fourier transform spectrum FT is calculated from the combined spectral response Sa, wherein the combined spectral response Sa is expressed in reciprocal wavelengths 1/λ.

Figure 4A:
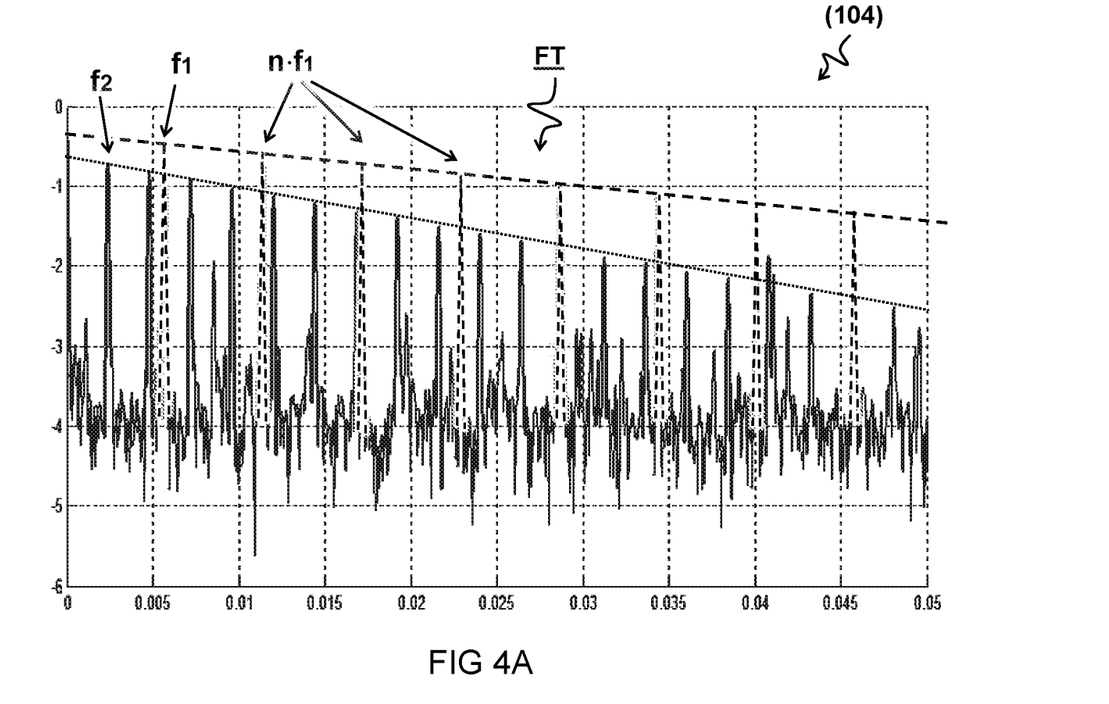
FIGS. 4A and 4B show graphs illustrating the identification and filtering of harmonic series in the Fourier spectrum.
Figure 4B:
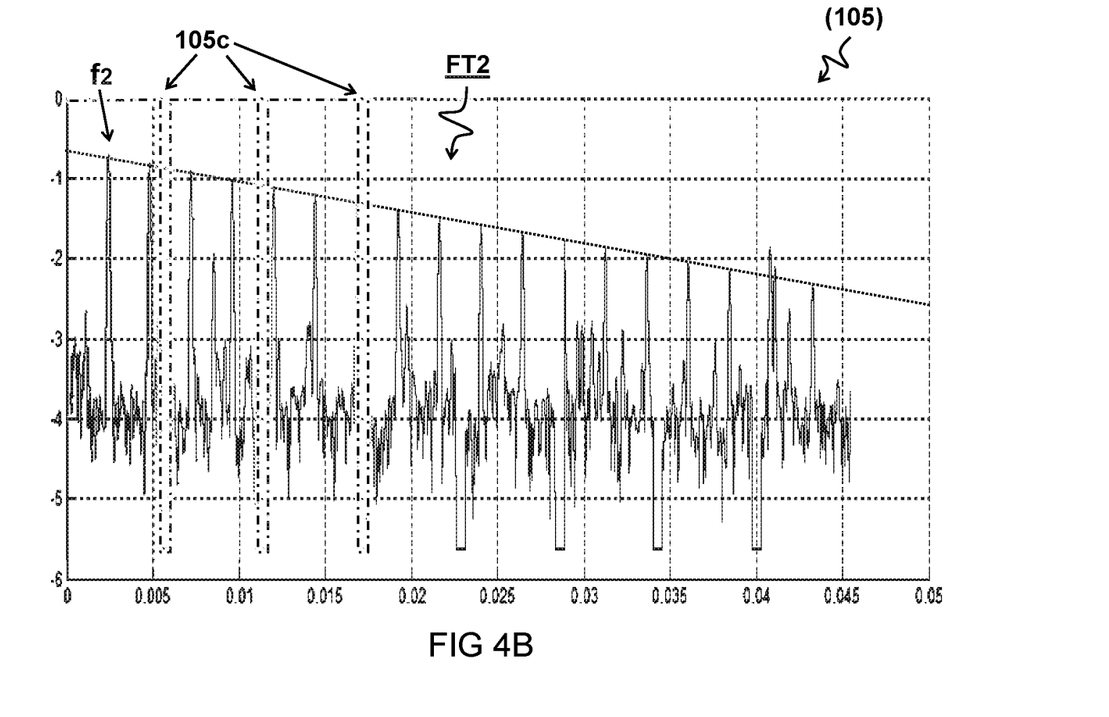

FIGS. 4A and 4B show graphs illustrating the steps 104 and 105 of identifying 104 and filtering 105 of harmonic series in the Fourier spectrum, respectively.

In one embodiment, the series of periodic peaks are determined 104 by selecting a main amplitude peak at a fundamental frequency f1 in the Fourier transform spectrum FT and including corresponding harmonic peaks of the fundamental frequency f1. In another or further embodiment, the main amplitude peak f1 is selected as a peak in the Fourier transform spectrum FT having a largest amplitude. For example, the determining 104 the series of periodic peaks comprises calculating and/or fitting a periodic pattern to the Fourier transform spectrum FT. As shown in the figure, the harmonic frequencies are typically found at integer multiples n·f1 of the fundamental frequency f1. In one embodiment, the periodic pattern to be fitted comprises a pattern of equidistant peaks having an amplitude that decreases for each subsequent peak.

In one embodiment, the filtering 105 the Fourier transform spectrum FT comprises application of filter that targets only the identified frequencies of a specific series. For example a periodic filter is used, i.e. whose filtering characteristic is periodic as function of frequency. For example, the filtering 105 the Fourier transform spectrum FT comprises application of a comb filter 105c with frequencies coinciding a series of periodic peaks of one of the optical resonators 11, 12. For example, the comb filter comprises a semi-block shaped function having a period coinciding with the frequencies n·f1 and a small block width around the peaks.

According to some embodiments, a filter is generated to filter out (or keep only) the fundamental peak plus non-overlapping harmonics of a specific ring. The filter may be applied e.g. to the FT of the serial response, and the filtered FT may be back-transformed to obtain the wavelength response of this ring. This procedure may be repeated for each ring. It is found that omission of harmonics that overlap with other harmonics may affect the ring response shape, but not individual λ1, if applied consistently over the experiment. In one embodiment, if multiple peaks are spaced too closely (closer than the bandwidth of the comb filter) they are optionally disregarded to avoid that a shift of one ring induces an observed shift in the other ring.

Figure 5A:
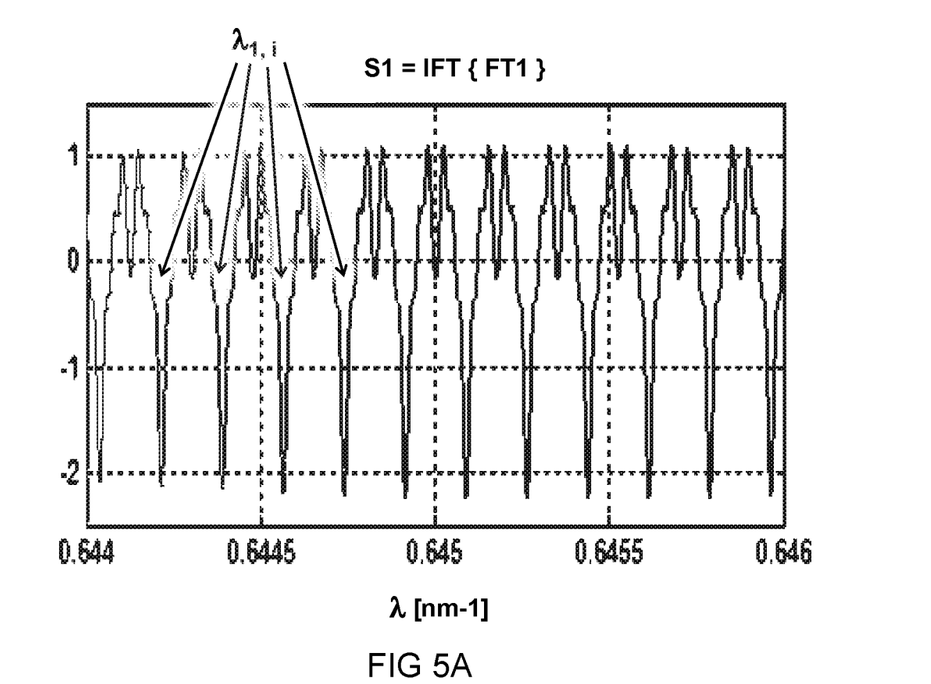
FIGS. 5A and 5B show graphs illustrating the back transformed filtered spectra per resonator.
Figure 5B:
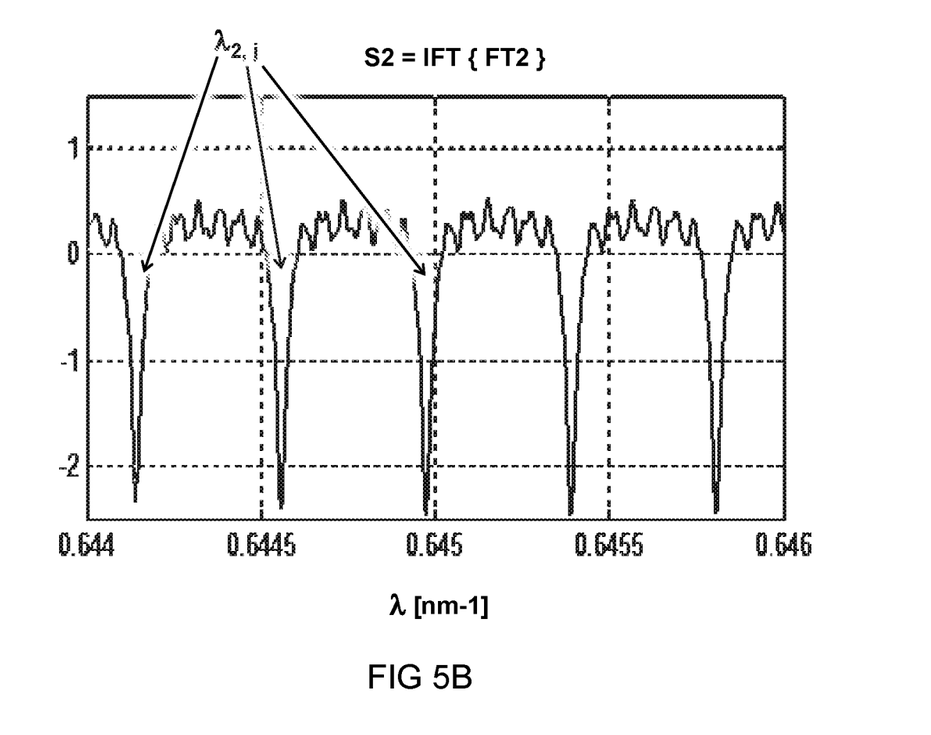

In the present example, two rings can be identified, and two comb filters may be generated to separate the peaks of each ring. Optionally, a linear fit is done on the peak frequencies to get a more accurate estimate of the ring frequency, e.g. prior to removing peaks which are too close. It is noted that a ring with high optical loss typically has wide resonances (large Full Width Half Max, FWHM) so in the FT the contribution of high frequencies is less. In this example the second resonator corresponding to the peaks f2 ring has relative high loss, the first resonator corresponding to the peaks f1 ring is lower-loss. Harmonics of the high-loss rings typically drop off faster than those of the low-loss ring FIGS. 5A and 5B show graphs illustrating the back transformed filtered spectra per resonator. It is noted that the shape of the peaks of the first resonator in FIG. 5A is somewhat distorted because in this particular calculation, the 3rd harmonic of the first resonator (see FIG. 4A) was omitted (too close to 7th harmonic of second resonator) so it's shape is distorted. However, it will be appreciated that its position is still accurate. Similarly the shape of the second resonator in FIG. 5B is distorted, but to a lesser degree since only the 7th harmonic is affected (see FIG. 4B). In one embodiment, at least two comb filters are applied with frequencies coinciding with two respective series of periodic peaks of two of the optical resonators, wherein a peak from one series is rejected, i.e. not part of the respective filtered Fourier spectrum, if it is too close to a peak from the another series within a threshold frequency difference. Of course also the peak from the other series may be rejected.

Figure 6A:
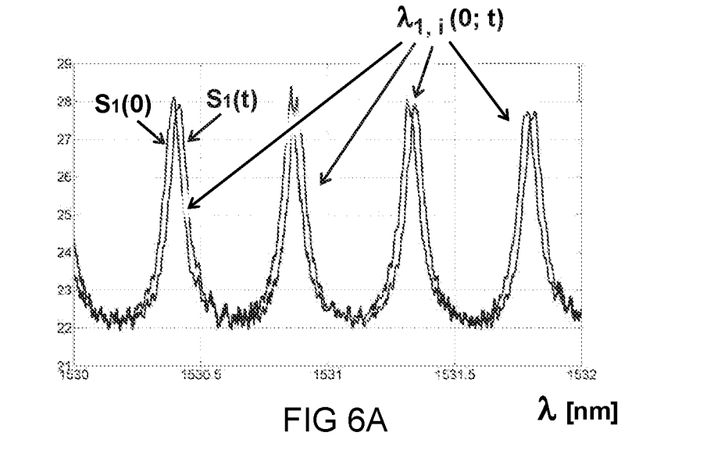
FIG. 6A shows a graph of a series of shifted resonance peaks for one resonator.
Figure 6B:
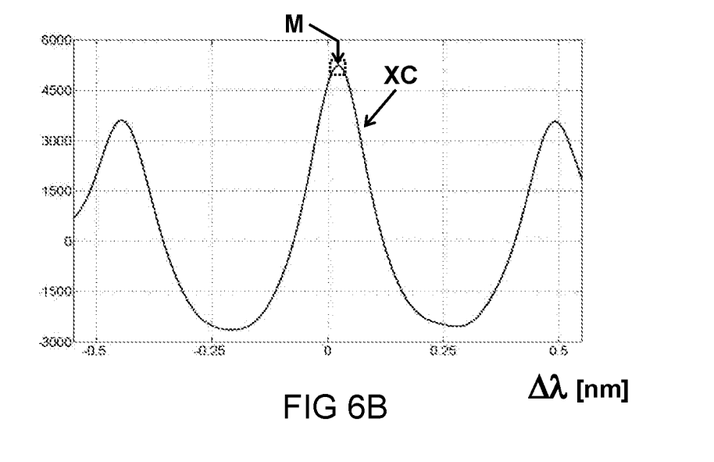
FIG. 6B shows a graph of the cross-correlation between the shifted peaks of FIG. 6A
Figure 6C:
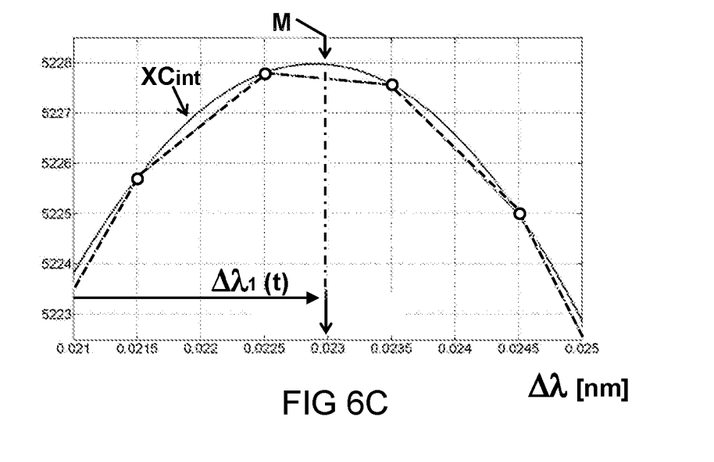
FIG. 6C shows a zoom-in of FIG. 6B wherein the cross-correlation is interpolated to determine the maximum.

FIG. 6A shows a graph of a series of shifted resonance peaks for one resonator; FIG. 6B shows a graph of the cross-correlation between the shifted peaks of FIG. 6A. FIG. 6C shows a zoom-in of FIG. 6B wherein the cross-correlation is interpolated to determine the maximum.

In one embodiment, the sensor signal is calculated based on a wavelength shift Δλ1 of peaks corresponding to one of the optical resonators. In another or further embodiment, the calculating the sensor signal X1 comprises calculating a cross-correlation XC between spectral responses S1(0) and S1(t) of one of the optical resonators. In another or further embodiment, the calculating the sensor signal X1 comprises determining a maximum M in the cross-correlation. In a further embodiment, the cross-correlation XC is interpolated XCint to determine the maximum M. In another or further embodiment, the calculating the sensor signal X1 comprises determining a wavelength shift Δλ1 corresponding to the maximum M. For example, sinc-interpolation is found preferable for band-limited signals. Alternatively, spline or polynomial interpolation can be used.

According to one aspect, the present disclosure provides a method comprising recording a first and second spectral response S1(0), S1(t) of one of the optical resonators 11 at different times "t", wherein the first and second spectral response comprise resonance peaks that are shifted in wavelength between the responses; calculating a cross-correlation XC between the first spectral response and the second spectral response; determining a maximum M in the cross-correlation XC; and calculating the sensor signal X1 based on position Δλ1(t) of the maximum M. While the method can be applied to the isolated signals S1, S2 as described herein, It will be appreciated that the method is not limited to the application of multiple resonators but can also be applied to calculate a sensor signal of a single resonator. The method provides advantages that a more accurate signal can be calculated of a shift. Further advantages may include that it is not necessary to know a priori the position of the resonance peaks.

Figure 7A:
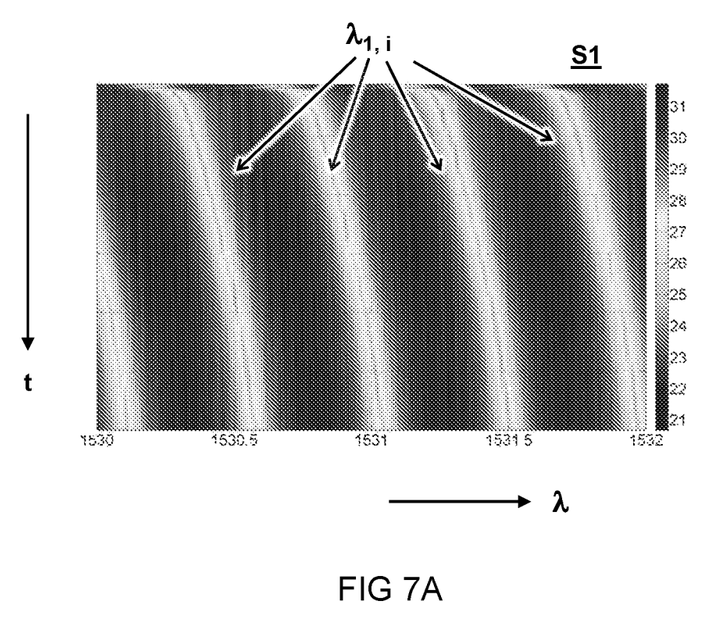
FIG. 7A shows a two dimensional plot of a peak amplitudes as a function of wavelength developing over time.
Figure 7B:
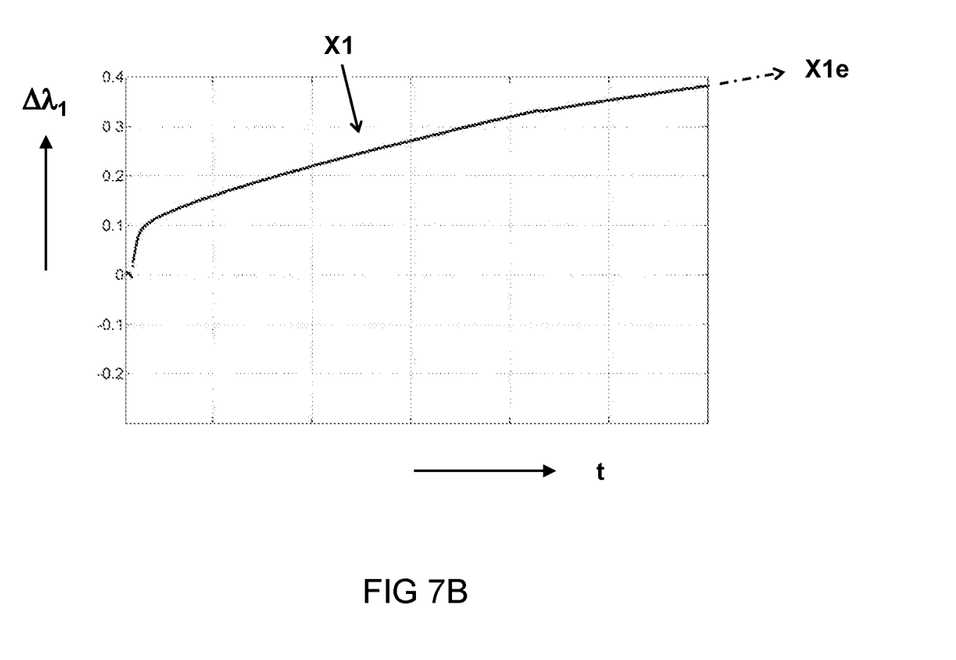
FIG. 7B shows the wavelength shift of the peaks in FIG. 7A over time.

FIG. 7A shows a two dimensional plot of a peak amplitudes $\lambda_{1,j}$ as a function of wavelength "λ" developing over time "t". FIG. 7B shows the wavelength shift Δλ1 of the peaks in FIG. 7A over time, e.g. calculated by the methods described with reference to FIG. 6. In one embodiment, the wavelength shift Δλ1 is recorded as a function of time. In another or further embodiment, a time dependent wavelength shift Δλ1t is extrapolated to determine an end value X1e for the sensor signal.

For the purpose of clarity and a concise description, features are described herein as part of the same or separate embodiments, however, it will be appreciated that the scope of the invention may include embodiments having combinations of all or some of the features described. For example, while embodiments were shown for multiple resonators, also alternative ways may be envisaged by those skilled in the art having the benefit of the present disclosure for achieving a similar function and result. E.g. some of the data processing techniques for extracting sensor values may find application also for other sensors comprising one, two or many resonators. The various elements of the embodiments as discussed and shown offer certain advantages, such as more accurate and automated measurement. Of course, it is to be appreciated that any one of the above embodiments or processes may be combined with one or more other embodiments or processes to provide even further improvements in finding and matching designs and advantages. It is appreciated that this disclosure offers particular advantages to biosensor arrays with a plurality of ring resonators, and in general can be applied for any application wherein multiple sensors produce overlapping periodic signal.

For example, according to some aspects, the present disclosure provides methods for calculating a sensor signal of one or more optical resonators, wherein the method comprises interrogating the optical resonator with an input signal covering a series of resonance peaks of the optical resonator, wherein the wavelengths of the resonance peaks are indicative of the sensor signal. The method may further comprise recording a first and second spectral response of the optical resonator, wherein the first and second spectral response comprise resonance peaks that are shifted in wavelength between the responses. The method may further comprise calculating a cross-correlation between the first spectral response and the second spectral response. The method may further comprise determining a maximum in the cross-correlation. The method may further comprise calculating the sensor signal based on position of the maximum. In some embodiments, the spectral responses are expressed in reciprocal wavelengths before cross-correlating. In some embodiments, the cross-correlation is interpolated to determine a position of the maximum beyond a sampling resolution of the spectral responses.

While the present systems and methods have been described in particular detail with reference to specific exemplary embodiments thereof, it should also be appreciated that numerous modifications and alternative embodiments may be devised by those having ordinary skill in the art without departing from the scope of the present disclosure. For example, embodiments wherein devices or systems are disclosed to be arranged and/or constructed for performing a specified method or function inherently disclose the method or function as such and/or in combination with other disclosed embodiments of methods or systems. Furthermore, embodiments of methods are considered to inherently disclose their implementation in respective hardware, where possible, in combination with other disclosed embodiments of methods or systems. Furthermore, methods that can be embodied as program instructions, e.g. on a non-transient computer-readable storage medium, are considered inherently disclosed as such embodiment.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A method for measuring a sensor comprising multiple optical resonators optically connected to a single optical output interface,
   wherein each optical resonator has a spectral response comprising a series of resonance peaks at distinct wavelengths,
   wherein the wavelengths of the resonance peaks are indicative of a sensor measurable, and
   wherein the method comprises:
      interrogating the optical resonators with a light input signal;
      determining, by measuring a light output signal from the optical output interface, a combined spectral response covering a wavelength range including a plurality of the resonance peaks for each of the optical resonators;
      calculating a Fourier transform spectrum of the combined spectral response;
      identifying a harmonic series of periodic peaks in the Fourier transform spectrum;
      filtering the harmonic series of periodic peaks to obtain a filtered Fourier transform spectrum;
      calculating a sensor signal based on the filtered Fourier transform spectrum.

2. The method according to claim 1, wherein the distinct wavelengths of the resonance peaks are determined by distinct optical path lengths of light traversing the respective optical resonator, wherein the optical path lengths of the resonators are at least a hundred times a wavelength of the light input signal.

3. The method according to claim 1, wherein the Fourier transform spectrum is calculated from the combined spectral response, wherein the combined spectral response is expressed in reciprocal wavelengths.

4. The method according to claim 1, wherein the series of periodic peaks are determined by selecting a main amplitude peak at a fundamental frequency in the Fourier transform spectrum and including corresponding harmonic peaks of the fundamental frequency.

5. The method according to claim 1, wherein the determining the series of periodic peaks comprises calculating and/or fitting a periodic pattern to the Fourier transform spectrum.

6. The method according to claim 1, wherein multiple series of periodic peaks are determined in the Fourier transform spectrum, wherein the step of filtering the Fourier transform spectrum is repeated to isolate spectral responses for a corresponding multiple of the optical resonators.

7. The method according to claim 1, wherein the filtering the Fourier transform spectrum comprises application of a comb filter with frequencies coinciding a series of periodic peaks of one of the optical resonators.

8. The method according to claim 1, further comprising
identifying a first series of harmonic peaks in the Fourier transform spectrum; and
identifying a second series of harmonic peaks in the Fourier transform spectrum;
wherein the filtering the harmonic series of periodic peaks comprises rejecting a subset of the identified peaks, wherein the rejected subset comprises peaks from the first series and peaks from the second series that are within a threshold frequency difference from each other.

9. The method according to claim 1, wherein the sensor signal is calculated based on a wavelength shift of peaks corresponding to one of the optical resonators.

10. The method according to claim 1, wherein the calculating the sensor signal comprises calculating a cross-correlation between spectral responses of one of the optical resonators.

11. The method according to claim 10, wherein the calculating the sensor signal comprises determining a maximum in the cross-correlation.

12. The method according to claim 11, wherein the cross-correlation is interpolated to determine the maximum.

13. The method according to claim 11, wherein the calculating the sensor signal comprises determining a wavelength shift corresponding to the maximum.

14. The method according to claim 1, further comprising recording a first and second spectral response, S1($t$)) of one of the optical resonators at different times, wherein the first and second spectral response comprise resonance peaks that are shifted in wavelength between the responses;
calculating a cross-correlation between the first spectral response and the second spectral response;
determining a maximum in the cross-correlation; and
calculating the sensor signal based on position) of the maximum.

15. An apparatus for measuring a sensor comprising multiple optical resonators optically connected to a single optical output interface; wherein each optical resonator has a spectral response comprising a series of resonance peaks at distinct wavelengths, wherein the wavelengths of the resonance peaks are indicative of a sensor measurable; the apparatus comprising
a light source configured to interrogate the optical resonators with a light input signal;
a light sensor configured to measure a light output signal from the optical output interface to determine a combined spectral response covering a wavelength range including a plurality of the resonance peaks for each of the optical resonators;
a controller configured and programmed to
calculate a Fourier transform spectrum of the combined spectral response;
identify a harmonic series of periodic peaks in the Fourier transform spectrum;
filter the harmonic series of periodic peaks to obtain a filtered Fourier transform spectrum; and
calculate a sensor signal corresponding to one of the optical resonators based on the filtered Fourier transform spectrum.

* * * * *